United States Patent [19]
Cameron et al.

[11] Patent Number: 5,662,805
[45] Date of Patent: Sep. 2, 1997

[54] PROCESS AND APPARATUS FOR CONTROLLING THE DEWATERING OF SUSPENSIONS

[75] Inventors: Timothy Ian Cameron, Mt. Keira, Australia; John Rodney Field, West Yorkshire, United Kingdom; Mark Stephen Glachan, Toronto, Australia; Peter James Tovey, West Yorkshire, United Kingdom

[73] Assignee: Allied Colloids, Ltd., Bradford, United Kingdom

[21] Appl. No.: 495,453

[22] PCT Filed: Jan. 24, 1994

[86] PCT No.: PCT/GB94/00130

§ 371 Date: Nov. 22, 1995

§ 102(e) Date: Nov. 22, 1995

[87] PCT Pub. No.: WO94/17895

PCT Pub. Date: Aug. 18, 1994

[30] Foreign Application Priority Data

Feb. 4, 1993 [GB] United Kingdom ............... 9302151

[51] Int. Cl.$^6$ ............... C02F 1/52; B01D 21/30
[52] U.S. Cl. ............... 210/709; 210/739; 210/744; 210/96.1; 210/97; 210/104; 210/108; 210/143; 73/61.64
[58] Field of Search ............... 210/96.1, 116, 210/406, 409, 411, 97, 198.1, 104, 709, 739, 744, 108; 73/61.64; 710/143

[56] References Cited

U.S. PATENT DOCUMENTS

| | | | |
|---|---|---|---|
| 3,262,878 | 7/1966 | Beckley et al. | 210/709 |
| 3,725,263 | 4/1973 | Harris et al. | 210/709 |
| 4,308,142 | 12/1981 | Braukmann et al. | 210/411 |
| 4,612,123 | 9/1986 | Eustacchio et al. | 210/709 |
| 4,627,914 | 12/1986 | Antonenko . | |
| 4,675,116 | 6/1987 | Hoyland . | |
| 4,986,881 | 1/1991 | Funk | 162/56 |
| 5,006,231 | 4/1991 | Oblad et al. . | |
| 5,462,678 | 10/1995 | Rosaen | 210/108 |

FOREIGN PATENT DOCUMENTS

| | | |
|---|---|---|
| 3908222 | 9/1990 | Germany . |
| 8905185 | 6/1989 | WIPO . |

OTHER PUBLICATIONS

World Filtration Congress III, 1982, pp. 253–261.

Teco Advertising Brochure "Drainac Continuous On–Line Freeness Measurement" and accompanying document Drainac Stock Line System.

*Primary Examiner*—Neil McCarthy
*Assistant Examiner*—Betsey J. Morrison
*Attorney, Agent, or Firm*—Sughrue, Mion, Zinn, Macpeak & Seas

[57] ABSTRACT

The addition of polymeric flocculant or other chemical dewatering modifier to a suspension flowing through a service line to a dewatering plant is controlled automatically in response to automatic determination of a filtration rate parameter. This may be determined using novel apparatus which includes a filtration assembly comprising a chamber with a filter element mounted across its open end and water sprays for washing the filter element. In one embodiment it is preferred to assist back-washing with an air purge while in another embodiment there are means for disassembling the filtration assembly to permit cleaning.

30 Claims, 5 Drawing Sheets

PROCESS AND APPARATUS FOR CONTROLLING THE DEWATERING OF SUSPENSIONS

This invention relates generally to processes and apparatus for automatic on-line control of the dewatering of suspensions such as sewage sludge, cellulosic paper-making sludge and mineral suspensions. In particular it relates to apparatus and methods for controlled addition of polymeric flocculant (or other chemical that influences dewatering) to aid dewatering, to control apparatus for automatic control of the addition of the flocculant or other chemical, and to components of this control apparatus.

It is standard practice to flow a suspension through a service line towards a dewatering plant where the suspension is dewatered and to flocculate the suspension prior to dewatering by adding polymeric flocculant to the suspension by flocculant dosing equipment. Optimum dewatering performance depends on the nature of the suspension, but this tends to be variable. As a result, various methods have been developed for determining the suitability of any particular suspension for dewatering.

Conventional methods involve taking a sample from the suspension and subjecting it to an appropriate test in a laboratory to ascertain a test parameter (eg. turbidity, viscosity or filtration rate), and then adjusting the overall process manually in response to the observed value. The laboratory test may be entirely manual, for instance filtration through a Buchner funnel, or the laboratory test may be automated to some extent, for instance as described in "An Automated Method for Filterability Determination" by de Moor and Gregory, World Filtration Congress III, 1982, pages 253 to 261. When the suspension is a sewage suspension, capillary suction time tests are common. When the suspension is a cellulosic suspension, drainage and freeness tests are common.

In particular, in the manufacture of paper it is conventional to adjust the level of beating and/or dilution of the cellulosic suspension in accordance with the measured freeness of the thick stock, and various batchwise laboratory methods are known for determining freeness in order to assist in optimising the process.

An automated method conducted on the suspension in the mill has been proposed by the Thompson Equipment Company (Teco) in their advertising brochure "Drainac (trade mark) Continuous On-Line Freeness Measurement". This brochure states that the Teco Drainac device operates on the filtration principle similar to the standard laboratory freeness tester. The Teco Drainac detector is said to consist of a vertical riser containing a perforated plate. A pressure differential between the suspension service line and the distant side of the filter plate causes filtration through the plate and the accumulation of a pad of fibres on the plate. The time required to draw a known volume of filtrate through the pad is used to calculate freeness. Once freeness has been determined, air pressure is increased to return filtrate and fibre to the stock line in preparation for the next cycle and at the same time flush water is introduced into the chamber to clean the screen. The flushing is said to force the collected fibre mat back into the service line.

Presumably it is intended that this should be done at the thick stock stage so that the fibre mat has an opportunity of becoming redispersed into the suspension. If it was done at the thin stock stage, the fibre mat would be likely to cause breaks or imperfections in the final paper sheet. The brochure states that the Teco Drainac system is suitable for use at stock line pressures of around 1.4 to 6.5 bar (20 to 90 psig) with air pressure and flush water each being at a pressure of not more than 0.7 bar (10 psig) above the line pressure. Accordingly the maximum water spray pressure is about 0.7 bar, and is often less. The Teco Drainac system is described solely in the context of monitoring freeness and other stock properties so as to give information about the stock, but the brochure also proposes that it can include a microprocessor, the output from which can be input to a refiner control system, i.e., for adjusting the freeness of the stock.

This Teco Drainac system may be of use for monitoring, and perhaps adjusting thick stock in paper manufacture but is of no relevance to the long-standing problem of improving control of flocculant addition prior to dewatering of, for instance, sewage sludge.

Various methods have been proposed for automating the control of the addition of flocculant to a suspension that is to be dewatered in response to measuring a test parameter of the suspension or, more usually, the filtrate. For instance in DE-A-3908222 waste water sludge is flocculated and then subjected to pressure filtration, and turbidity of the filtrate is determined in a turbidimeter as a test parameter, and the results are compared with target values and are used to control the flocculant supply.

In EP-A-272673 flocculant is added to a suspension that is to be dewatered and the quantity, size and/or structure of the resultant flocs are measured continuously or periodically and the resultant test parameter is utilised to control the addition of flocculant.

In CA 111(14)120321n the effluent from a dewatering centrifuge is monitored for pH, heavy metal concentration and suspended solids and the resultant test parameter is used for controlling the process.

In U.S. Pat. No. 4,627,914 a pressure filter is used to dewater a suspension and includes a control assembly for determining the duration of the dewatering process and in particular the moment when the solid phase of the suspension reaches assigned parameters, and the resultant test parameter is used fog controlling the process.

In DE-A-4,234,507, measurement of capillary suction time is utilised in the addition of coagulant to sewage sludge.

Other methods for attempting to automate the control of a flocculation process of which we are aware in the industry include observation of test parameters including viscosity changes, the solids mass balance (between the suspension, the cake, and the filtrate), turbidity values conducted on the filtrate, the residual charge reading from a streaming current detector and charge titration, but in practice none of them have proved sufficiently convenient and reliable to be adopted widely.

One problem with most detection methods is that the detection apparatus is liable to become so heavily contaminated, especially if the detection apparatus is in contact with the suspension rather than being in contact solely with the filtrate, that an adequately reproducible test parameter cannot conveniently be obtained. Batchwise laboratory apparatus permits cleaning and therefore avoidance of contamination, but does not permit convenient on-line automated control of the addition of flocculant or other chemical.

Methods conducted on the filtrate can be useful for optimising the flocculant addition with respect to the clarity and the solids content of the filtrate, but may not give a useful indication for optimising the flocculant addition from the point of view of other filtration performance characteristics such as the rate of filtration or the solids content of the final filter cake. Accordingly they may be of little or no assistance in some dewatering processes.

There therefore remains a need for being able to conduct an adequately reliable, automatic, on-line determination on a suspension using an effective test parameter that is relevant to the dewatering performance of that suspension, and to utilise that parameter for automatic control of the addition of flocculant so as to optimise the dewatering of the suspension.

In the invention we provide control apparatus for controlling the addition of a chemical dewatering modifier by chemical dosing equipment to a suspension that flows through a service line towards a dewatering plant, wherein the apparatus comprises testing means for measuring a test parameter of the suspension and dose control means for automatically controlling the addition of the chemical by the dosing equipment in response to the measured test parameter, wherein the testing means includes a filtration assembly comprising a filter element, and inlet means connectable to the service line for providing fluid communication between the filter element and the service line whereby suspension can be caused to flow from the service line to, and to be filtered through, the filter element, and means for measuring a filtration rate parameter of the suspension during the filtration of the suspension through the filter element, and wherein the filtration rate parameter can be utilised by the dose control means as the measured test parameter for automatically controlling the addition of the chemical.

In the invention, we also provide apparatus for flocculating a suspension and for dewatering the flocculated suspension. The apparatus may comprise a dewatering plant, a service line through which the suspension can flow to the dewatering plant, chemical dosing equipment by which polymeric flocculant or other chemical can be dosed into the suspension, and apparatus as defined above for controlling the addition of the chemical. Thus the apparatus according to the invention for flocculating a suspension and dewatering the suspension may be conventional-apparatus except for the incorporation of the novel control apparatus for controlling the addition of the chemical.

The invention also includes processes for dewatering a suspension using such apparatus. In this process the suspension is pumped through the service line, chemical dewatering modifier is added to the suspension by the chemical dosing equipment prior to, during or after flow through the service line, and the flocculated suspension is dewatered in the dewatering plant (all of which may be conventional), and in the invention a filtration rate parameter of the suspension is measured by utilising the said testing means of the control apparatus, and the addition of polymeric flocculant or other chemical by the dosing equipment is automatically controlled by the dose control means of the control apparatus in response to the measured filtration rate parameter.

Thus in the invention we perform an actual filtration in an on-line process using the suspension itself and thereby determine a filtration rate parameter and utilise this parameter for automatically controlling the addition of the polymeric flocculant or other chemical.

The filtration rate parameter can be any parameter that is determinable by monitoring a filtration step. It can involve determining the filtration rate a predetermined time after the start of a filtration cycle, or determining the change in filtration rate as a function of time or determining the total volume of filtrate collected until the filter blinds or the filtration rate drops to a predetermined value. Generally the filtration rate parameter is determined as the filtration volume which is achieved in a predetermined time or the time required for achieving a predetermined filtration volume, and the means for measuring the filtration rate parameter therefore generally comprise means for timing and for measuring volume. Although we refer to volume, this is for convenience and it is, of course, equally possible to measure mass. The filtration volume (or mass) that is recorded may be the volume of the suspension that is being filtered or it may be the volume of the filtrate that has been filtered.

In order to eliminate variations in measured filtration rate due to changes in the pressure drop across the filter element (especially when filtration is promoted or caused by the pressure in the service line), the apparatus may include means for maintaining the pressure drop across the filter element at a predetermined value and/or means for determining the pressure drop and correcting the filtration rate at any particular time according to variations in the pressure drop.

The filtration assembly can be any suitable construction that provides a support for a filter element and that permits measurement of a filtration rate parameter through the filter element. The assembly usually includes a chamber which is open at one end across which the filter element is or can be fitted in fluid-tight relationship. This chamber can either be for receiving filtrate that has filtered through the filter element or it can be for holding suspension that is to be filtered through the filter element.

The apparatus may also include a plurality of sprays, often permanently mounted with respect to the chamber, and positioned to direct water against substantially the entire surface of the filter element, and means for supplying pressurised water to the sprays. The sprays may be mounted in or on the chamber or in some other way fixed relative to the chamber and oriented so that they achieve thorough washing of the filter element when it is in the required position for such washing. By this means it is possible to wash filtered solids off the filter element.

Use of the apparatus necessarily involves a series of operations, for instance causing the filtration of the suspension through the filter element and subsequently the washing of filtered solids off the filter element by supplying pressurized water to the sprays, and the control apparatus of the invention preferably comprises a sequential filtration control for causing each of the operations to occur in the desired sequence. The timing means that may be required (eg. for timing the collection of the filtration volume) are usually incorporated in this filtration control.

Although it can be suitable in some instances to discharge the filtered solids back into the service line, it is preferred that the apparatus should include discharge means, that can be operable by the sequential filtration control, for running to drain the filtered solids washed off the filter element. Thus, if the apparatus is being used on a cellulosic suspension, the deposited layer of cellulosic fibres can be discharged to waste instead of being fed back into the service line. This reduces the risk of disconformities in the final sheet, especially when the suspension is a thin stock (for instance below 2% solids).

The apparatus often also includes an inlet valve in the inlet means and this valve may be operable by the sequential filtration control in order to isolate the filter element from the service line. This isolation in some instances may be required during filtration, and in other instances may be required during washing of the filter element.

In order to minimise the risk of error due to fouling of the apparatus, it is desirable to insure thorough washing of the filter element. For this purpose we prefer that the pressurised water which is used for the sprays should be supplied at a pressure such as to provide a pressure drop through the sprays of at least around 5 or 10 bar and generally at least about 20 even about 50 bar, and up to around 100 bar. The use of the higher pressures, e.g. above 30 and often above 50 bar, is useful for promoting cleaning, especially when the suspension is sewage sludge.

The filter element can be formed of a mesh disc having a mesh size selected for the suspension to be tested. For instance it can be a woven bronze mesh such as C19-65 as used in the Scandinavian Standard Freeness Test. It can instead be a perforated stainless steel plate such as is used in this freeness test, for instance 0.4 mm thick with 0.5 mm holes spaced at 1 mm centres and around 100 per 100 $mm^2$ when used for a cellulosic suspension.

Preferably the element is formed of perforated sheet material such as electro-perforated sheet metal, usually nickel. The pore size of the filter element typically is from 0.05 to 2 mm, depending upon the nature of the suspension. For instance when the suspension is a sewage suspension the pore size typically is 0.2 to 1 mm, when the suspension is a mineral suspension the pore size is typically 0.05 to 0.2 mm, and when the suspension is a cellulosic suspension the pore size is typically 0.2 to 2 mm.

It is particularly preferred (especially for use with sewage) that the filter element should be a sheet that is provided with drainage apertures (usually made as electro-perforations) which have a conical shape wherein the diameter of each aperture is larger at the end of the aperture distant from the sprays that are provided for washing the filter element than at the end towards the sprays. Thus the apertures open outwardly in the direction of washing by the sprays, and this facilitates cleaning of the apertures. For instance the diameter at the end distant from the sprays may be 1.2 to 2.5 times the diameter at the end closer to the sprays. Suitable filter element material which has conical apertures of this type is available from Utildi AB, Laholm, Sweden.

The chamber can be of any convenient shape but typically is cylindrical. It can be formed of sheet metal or other fluid-impervious material.

The filtration assembly can be arranged either to filter downwards under gravity (optionally assisted by an applied pressure differential) or by vacuum with the flow during filtration often being upward.

In a first embodiment of the invention the filter element in the filter assembly is between the chamber and the inlet means and there are means for maintaining the chamber at a lower pressure than the pressure in the service line while the filter element is in fluid communication with the service line. As a result, filtration of suspension from the service line through the filter element will occur, with collection of filtrate in the chamber. In this embodiment, the sprays conveniently are positioned for back-washing the filter element and so may be positioned in the chamber.

The means for maintaining the chamber at a lower pressure than the pressure in the service line can comprise a vacuum pump for applying vacuum to the rear face of the filter element, i.e., in the chamber. This facilitates controlling and varying the pressure drop across the filter element, for instance according to whether filtration or back-washing is desired. Instead of or in addition to applying vacuum in the chamber, it is possible to rely upon pressure-applying means in the service line, for instance a service flow pump in combination with means for maintaining a lower pressure on the rear side of the filter element. For instance the chamber may be exposed to atmospheric pressure. Generally at least some of the required pressure drop across the filter element is due to the service line being at an elevated pressure (above atmospheric). For instance the pressure in typical approach flow systems in paper making may be up to 1–2 bar above atmospheric and the pressure in the pressurised line leading to a pressure filtration apparatus, such as a filter press typically is 7–15 bar. A suitable pressure drop across the element is usually much less (e.g. 0.1–2 bar) and so pressure may have to be applied behind the element to reduce the pressure drop to an acceptable amount.

The filtration rate parameter will depend, for any particular suspension and filter element, upon the pressure drop. If the pressure drop is variable, the means for determining the filtration parameter will normally include means to correct the recorded parameter according to changes in the pressure drop. Preferably, however, the pressure drop is maintained substantially constant, for instance by varying the pressure in the chamber according to variations in the pipeline. A pressure transducer may be provided for this purpose.

In the first embodiment, the filter element is preferably directly exposed during filtration to the suspension flowing through the service line. The filter element can be fitted in the sidewall of the service line or of a bypass, in which event the inlet means connectable to the service line for providing fluid communication between the filter assembly and the service line merely constitute the face of the filter element that is exposed to the suspension in the service line (or in the bypass through which a portion of the total suspension flows). For instance the filter element may cover an opening in the wall of the service line and the chamber may be fitted behind the filter element so as to provide a fluid-tight seal between the chamber, the filter element and the service line. The filter element may be shaped and positioned such that it adopts the same profile as the remainder of the adjacent sidewall.

One advantage of fitting the filter element in the sidewall of the bypass (instead of in the service line) is that it can sometimes be easier to create the desired pressure drop between the by-pass and the chamber than between the main service line and the chamber. Also, it is often desirable to be able to shut the filter element off from the main service flow, for instance during cleaning and to facilitate replacement of the filter element while service flow continues.

If the filter element is in a by-pass, rather than the main service line, it is necessary to ensure that the by-pass is constructed in such a manner as to minimise blockage. If there are valve means for closing the beginning and/or end of the by-pass, these valve means should be of a design and size such that they do not tend to cause blockage.

Instead of being fitted in the wall of the service line or a bypass, the filter assembly may be mounted in the flow path within the service line. The chamber, its mounting and its feed pipes and other equipment associated with it should be designed so as to minimise the risk of blockage. The filter assembly may typically be arranged with the plane of the filter element substantially parallel to the sidewall of the service line.

Irrespective of where the filter element is mounted, it is preferred that a sleeve should extend from around the periphery of the filter element in a direction leading away from the sprays and that there should-be air supply means for supplying an air purge through the filter element in a direction leading away from the sprays so as to establish an interface in the sleeve between air and liquid in the apparatus. Thus, when the air purge is applied the air displaces the suspension or other liquid that would otherwise be in the sleeve and forces it towards the service line, defining an interface across the sleeve between the air (on the side towards the source of the air purge), and liquid, on the side of the service line.

For this purpose, it is not essential that the sleeve should have the same diameter as the periphery of the filter element and it can be a little smaller or it can be larger. Increasing the dimensions of the sleeve increases the amount of purging air that is required since some of the air can move radially instead of being confined to axial movement, and so generally the sleeve is not substantially larger than the periphery of the filter element. With such an apparatus the sequential filtration control is arranged so as to cause the air purge to force the interface along the sleeve onto the side of the filter element distant from the sprays before and/or during the supply of pressurised water to the sprays. As a result, the spraying water is impacting on the filter element and is displacing solids from the filter element solely in an atmosphere of air, and as a result the cleaning is much more efficient than when the sprays are directed onto a filter element that is still submerged in filtrate or suspension. Also the air purge may itself remove some solids from the filter element. Generally the air purge is applied for sufficient time to displace the interface along the sleeve and this may only be a few seconds up to a minute of more, for instance 5 to 60 seconds, prior to the start of spraying. Generally the air purge is continued during some or all of the spraying.

The sleeve can be provided solely for facilitating displacement of the interface away from the filter element and thus such a sleeve, in the form of a relatively shallow collar, may be useful when the filter element is fitted in the wall of the service line, i.e. with the collar extending into the service line.

Preferably, the filtration assembly is in a spur or side arm to the service line and thus the inlet means may comprise an inlet duct which constitutes the spur or side arm, and the walls of this duct may serve as the sleeve. The filter element may be mounted in a sidewall of the spur but preferably the filter element is mounted across one end of the spur. The other end of the duct or spur should include means for fitting to the service line or it may be fitted to or integral with the service line. The inlet duct may include an inlet valve operable by the sequential filtration control for closing the duct and thus isolating the filtration assembly from the service line. For instance this may be useful during back-washing and/or during the air purge if that is applied.

The effect of back-washing will normally be to discharge the solids washed-off the filter element back into the service line, but this can be undesirable in some instances which is why it can be preferable to provide discharge means operable by the sequential filtration control for running to drain the filtered solids that are washed-off the filter element. One convenient way of achieving this is to provide a valved drain outlet from the duct operable by the sequential filtration control and that can be opened to permit drainage of wash water (including solids) from the duct when the filter element is isolated from the service line by the inlet valve. For instance the duct can include a three-way valve whereby the filtration assembly is exposed either to the service line or to a drain.

The spur or side arm that defines the inlet duct preferably extends upwards such that the filter element is above the level of the service line and the chamber is preferably above the filter element. If instead it extends substantially horizontally it may be difficult to achieve uniform pressure distribution across the filter element, during the start-up or during the air purge, and if it extends downwardly there may be difficulty in displacing filtered solids upwards from the screen. These problems are avoided by arranging the duct to extend upwardly but it is desirable that the duct should be as short as reasonably possible so as to minimise the risk of non-uniform conditions prevailing through the length of the duct.

Although the means for recording the filtration rate parameter can be incorporated entirely in the chamber into which the filtrate is initially collected, it is generally preferred to provide a filtrate-receiving tank or other receiver in fluid communication with the chamber to receive the filtrate from the chamber. Preferably the receiver is arranged with respect to the chamber so that substantially all the filtrate is substantially immediately removed from the chamber into the receiver. Some or all of the means for determining the filtration rate parameter are usually provided in this receiver. For instance, the receiver may include volume-recording means, for determining the volume of filtrate collected in a predetermined time or for determining the time to collect a predetermined volume. The tank may be integral with the chamber or, more usually, is connected to a drain from the chamber and drainage is achieved either by gravity or by applying suction to draw filtrate from the chamber. When there is more than one filter assembly, all the chambers may feed into a single tank. As a result of providing a separate tank for receiving filtrate, it is possible to filter a much larger volume of suspension in a cycle, while using a relatively small filtration assembly, than would otherwise be possible.

In a second embodiment of the invention, filtration is under gravity, or gravity assisted by a pressure differential, and the chamber is an upright chamber with the filter element in its base. In this type of filtration assembly, the suspension preferably is not exposed to the service line pressure during filtration and instead is preferably isolated from the service line during filtration.

In this type of assembly, the inlet means generally comprises a pipe leading from the chamber above the filter element and connectable to the service line for leading suspension from the service line into the chamber and there is an inlet valve in the pipe operable by the sequential filtration control for isolating the chamber from the service line. The inlet means may include means for recording and/or controlling the volume of suspension that flows into the chamber.

Drainage is downwards through the filter element and as a result solids will tend to accumulate on its upper surface, in the base of the chamber. In order to permit cleaning, the apparatus may include support means for the filter element operable by the sequential filtration control alternately for holding the filter element in fluid-tight contact with the base of the chamber (during the filtration stage) and for separating the filter element from the chamber before and during the supply of pressurised water to the sprays (during the cleaning stage).

During the cleaning of the filter element, filtered solids are washed off it and the combination of the spraying and a drain outlet or other suitable discharge point from a housing in which the assembly is mounted constitutes discharge means operable by the sequential filtration control for running to drain the filtered solids washed-off the filter element.

If desired, there can be a vessel underneath the filter element, for instance in fluid-tight contact with it, for collecting filtrate. If there is such a vessel vacuum can, if required, be applied to the vessel so as to promote the rate of filtration down through the filter element.

The filtration assembly may include means for determining the filtration volume in a predetermined time or for determining the time required for a predetermined filtration volume. When the means are located in the chamber or the inlet, the volume that is measured will be the volume of suspension, but when there is a collection vessel for receiving filtrate through the filter element the means may be located in this vessel, in which event the filtration volume will be the volume of filtrate.

One way of alternately holding the filter element in the chamber and for separating the filter element from the chamber is to provide means for sliding the filter element transverse to the chamber between a position in which the filter element is in fluid-tight contact with the lower end of the chamber and a position in which the filter element is outside the chamber and is positioned to be washed by the pressurised sprays of water. Thus these sprays may be located at any convenient position in the apparatus such that they are effective for cleaning the filter element when it is separated from the chamber.

The preferred way of arranging the filtration assembly is to provide support means for the filter element that alternately hold the filter element in fluid-tight contact with the base of the chamber and separate the filter element downwardly from the chamber. Thus the chamber and the filter element may be caused to reciprocate vertically with respect to one another between a closed position where they are in fluid-tight contact and an open position where there is a space between the bottom of the chamber and the filter element, thus permitting washing of solids off the filter element by the sprays, which conveniently can be located in the chamber.

This apparatus may include means for recording the time taken for a predetermined volume of suspension to drain through the filter element. For instance there may be upper and lower liquid level detectors in the chamber to define the predetermined volume and there may be timing means for timing the time taken for the suspension to drain from the upper level detector to the lower level detector. The volume of suspension that is filtered will generally include the volume of suspension in the inlet pipe between the inlet valve and the chamber and so it is convenient to arrange the inlet so as to minimise this volume and, in particular, so as to ensure that errors are not introduced due to variations in the volume of suspension draining out of the inlet pipe into the chamber.

In order to simplify determination of the filtration volume, it is desirable to fill the chamber and then to isolate the chamber from the service line by closing an inlet valve before filtration starts.

Preferably the filtration assembly includes a housing that extends down from around the filter element and includes a valve for closing the housing beneath the filter element and preferably as close as possible to the filter element, so as to prevent drainage through the filter element. Preferably there is a plug valve vertically reciprocable relative to the filter element so as to prevent drainage through the filter element when the plug valve is pressed towards the filter element to adopt a sealing position. Generally the filter element is arranged with a shallow housing or collar extended a short distance down from around the periphery of the filter element and the plug valve is vertically reciprocable relative to the filter element and makes a fluid-tight fit within this collar or housing.

It is convenient to be able to lower the plug valve without immediately starting drainage through the filter element. This can increase the accuracy of the process as it reduces the possibility of errors in recording the filtration rate at the start of the cycle. Accordingly it is desirable for the filtration assembly to be such that the chamber can be closed above the filter element (ie. all ports and other apertures should be capable of being sealed) and there should be air bleed means operable by the sequential filtration control for allowing ingress of air into the chamber above the filter element at the desired time. If desired, vacuum can be applied through the bleed or other suitable orifice to reduce the risk of suspension draining prematurely down through the filter element.

The operation of the various types of filter assembly used in the invention as the testing means is normally in a batchwise mode consisting of a filtration cycle followed by a cleaning cycle, so that each filtration cycle starts with a clean filter element. Within each filtration cycle, filtration through the filter element may be conducted substantially continuously, except during back-washing or other cleaning, in which event it can be operated to give continuous or occasional information on the rate of filtration. Alternatively, the filtration can be conducted only intermittently or for part of the time, in which event it may be convenient, when measurement is not required, to prevent or minimise filtration through the filter element. For instance in the second embodiment the plug valve may be moved into the closed position, and in the first embodiment an inlet valve leading to the filter element may be closed or the pressure drop across the filter element may be reduced.

Appropriate computer means are provided as the sequential filtration control for sequential operation of each batchwise cycle, but it should be understood that if desired some of the operations can be performed manually. The computer may provide merely a signal that is fed to the dose control means for automatic control of the addition of the polymeric flocculant or other chemical in response to that signal, but often also provides a read-out to allow the plant operator to intervene in the control of the process if appropriate.

Generally the control apparatus includes a single supervisory computer that controls the valves that control filtration, back-washing and measurement of filtration rate during each cycle as well as including the timer, if required, for determining filtration rate and the dose control means for actuating the dosing equipment.

If desired, a filtration assembly may include more than one filter element, and/or the testing means in the control apparatus may include more than one filtration assembly, and/or there may be more than one testing means in the control apparatus. For instance the control apparatus may record a filtration rate parameter in the manner described above and some other test parameter in known manner. Two control systems may be used, often measuring different test parameters. When two or more control systems are used, or when one control system providing two or more test parameters is used, one may be used to control chemical dosage and the other may be used to control the other process conditions.

Although the control apparatus is primarily intended for automatic control of the dosage of polymeric flocculant or other chemical, the control apparatus preferably includes a display for displaying the filtration rate parameter and a manual control for the dosing equipment to allow manual over-ride of the automatic control. The control apparatus can additionally be used for controlling other parts of the dewatering process, for instance, by diluting the initial suspension or controlling the dewatering conditions.

The dosing equipment can be conventional apparatus for dosing polymeric flocculant or other dewatering modifier, generally as a dilute solution, into the suspension. The control of the dosing equipment can involve control of the speed or duration of a pump feed or the adjustment of feed valves or other means for achieving the desired controlled addition of polymeric flocculant.

The chemical dosing equipment that is controlled by the filtration rate parameter may be downstream or upstream of the point in the service line at which the filtration rate parameter of the suspension is recorded (ie. the point where the inlet means leads from the service line to the filter element). Thus the filtration rate parameter may be determined on a suspension that has not been flocculated or has been flocculated only to a limited extent, and further chemical may then be added subsequently, prior to dewatering. Alternatively, the filtration rate parameter may be determined on a suspension to which flocculant has already been dosed and the parameter is then used to modify, if appropriate, the dosage that is being added.

The dewatering apparatus may be any conventional dewatering apparatus suitable for the suspension that is to be dewatered. It may be, for instance, a belt press, centrifuge, filter press, vacuum filter or drainage screen.

The chemical can be any chemical material that has an effect on the dewatering. Generally the chemical is a polymeric flocculant which has a high molecular weight (eg. intrinsic viscosity above 4 dl/g) and is of the type that is commonly referred to as a bridging flocculant, but if desired the flocculant can be a low molecular weight (eg. intrinsic viscosity below 3 dl/g), highly ionic, polymeric material of the type that is frequently referred to as a coagulant. When the flocculant is being added to a cellulosic suspension, the flocculant is normally selected for suitability as a retention aid and the suspension can be a thick stock or a thin stock. Conventional retention aids can be used. When the suspension is a sewage, mineral or other suspension then any of the conventional flocculants for these can be added. The dosage of added flocculant or retention aid is usually within the conventional ranges.

Other chemicals that can be dosed in the invention include inorganic coagulants such as multivalent salts, colloidal silica or polysilicic acid or derivatives of these, polyethylene imine, polyethylene oxide, natural polymers such as starch or cationic starch, lignosulphonates, ionically modified alkyl ketene dimer or alkenyl succinic anhydride sizes, and inorganic materials such as swelling clays, generally known as bentonites.

The suspension generally has a solids content of at least about 0.1%. An advantage of the invention is that it is capable of being used very effectively on dilute suspension, for instance up to 2 or 2.5% solids, but it can also be used on more concentrated suspensions such as paper thick stock or coal tailings. Preferably the suspension has a substantial proportion of suspended solids above 100 μm.

The invention is of particular value for controlling the dewatering of sewage sludge in a belt press, centrifuge or filter press (especially using the first embodiment).

The invention also includes novel filter assemblies. These include the described assemblies wherein the filter element has conical drainage holes as described above. The novel assemblies also include the described filter assemblies of the second embodiment, especially those wherein the chamber and the filter element are separated vertically to allow cleaning. The novel assemblies also include those arranged to allow the filtered solids that have been washed off the filter element to run to waste. The invention includes apparatus for either manual or automated operation of such assemblies, and apparatus for the use of the resultant filtration rate parameter for manual or automatic control of a dewatering process. This control may involve controlling flocculant dosage, dilution of the suspension, adjusting freeness of a paper stock, or controlling the process conditions in the dewatering plant.

The invention is illustrated in the accompanying drawings in which.

Figure 5:
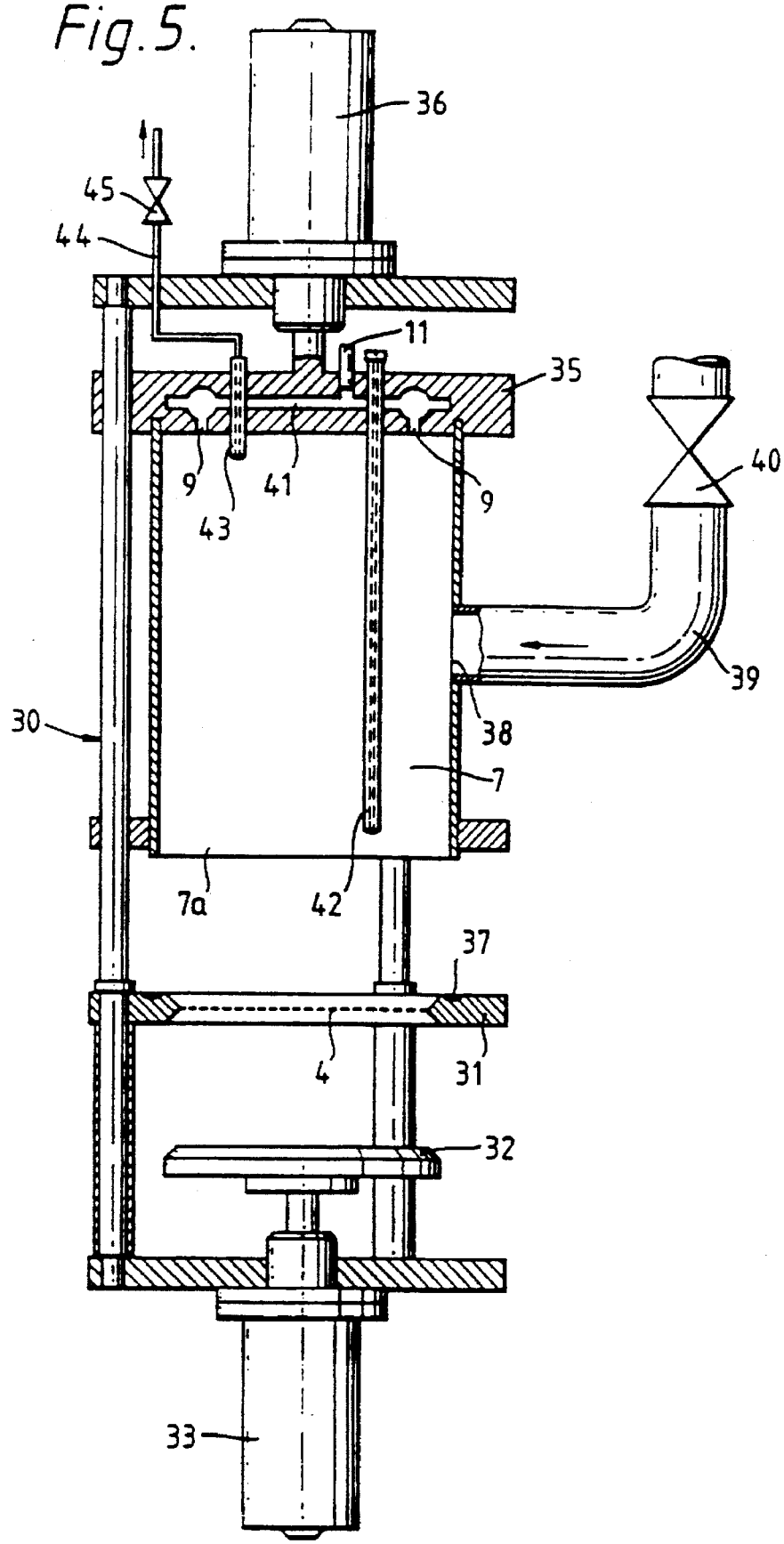

FIG. 5 a drawing of a different filter assembly of the invention, shown in its dis-assembled state.

Figure 1:
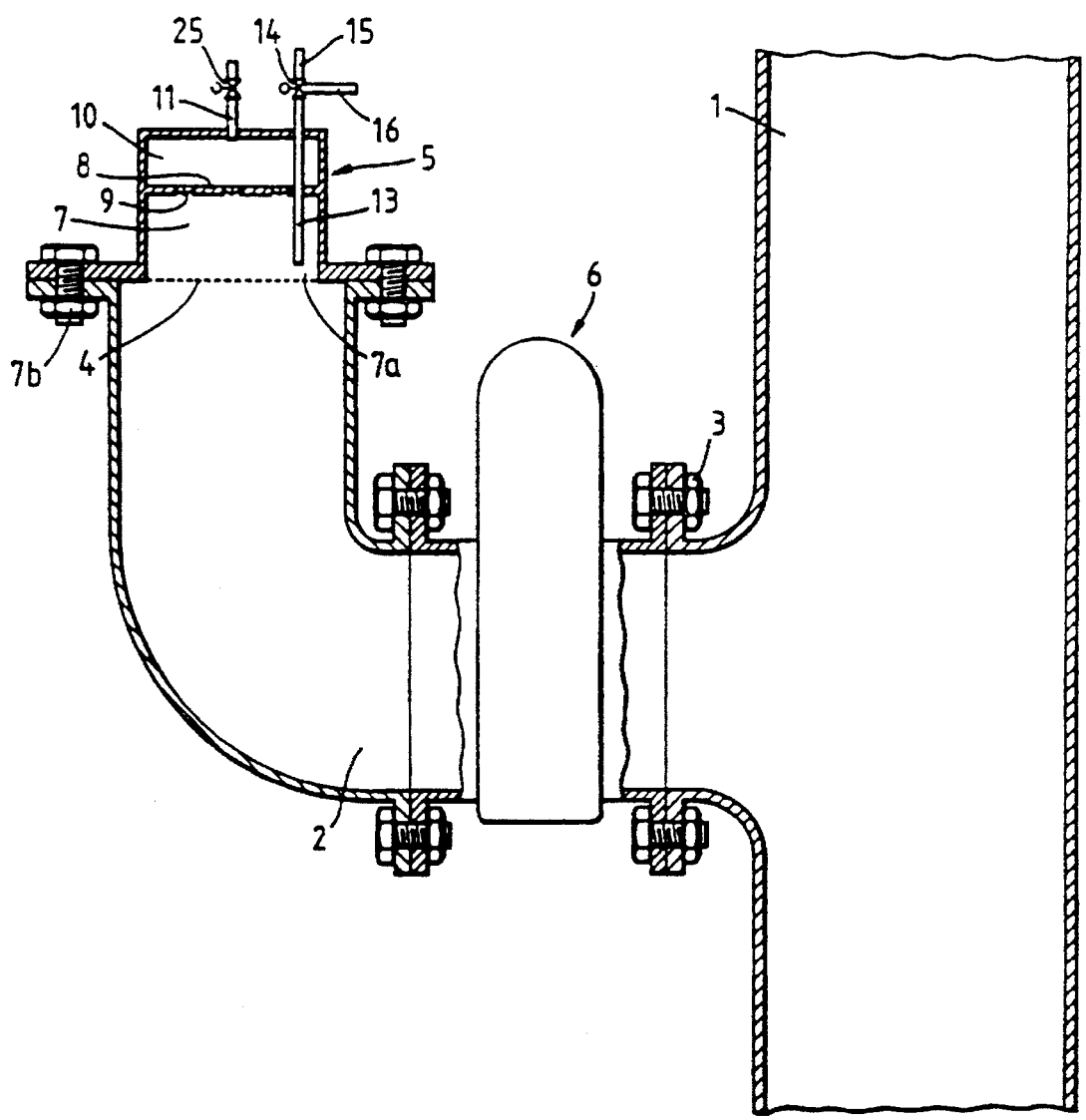
FIG. 1 is a section through a control apparatus, including a filtration assembly, of the invention.
Figure 2:
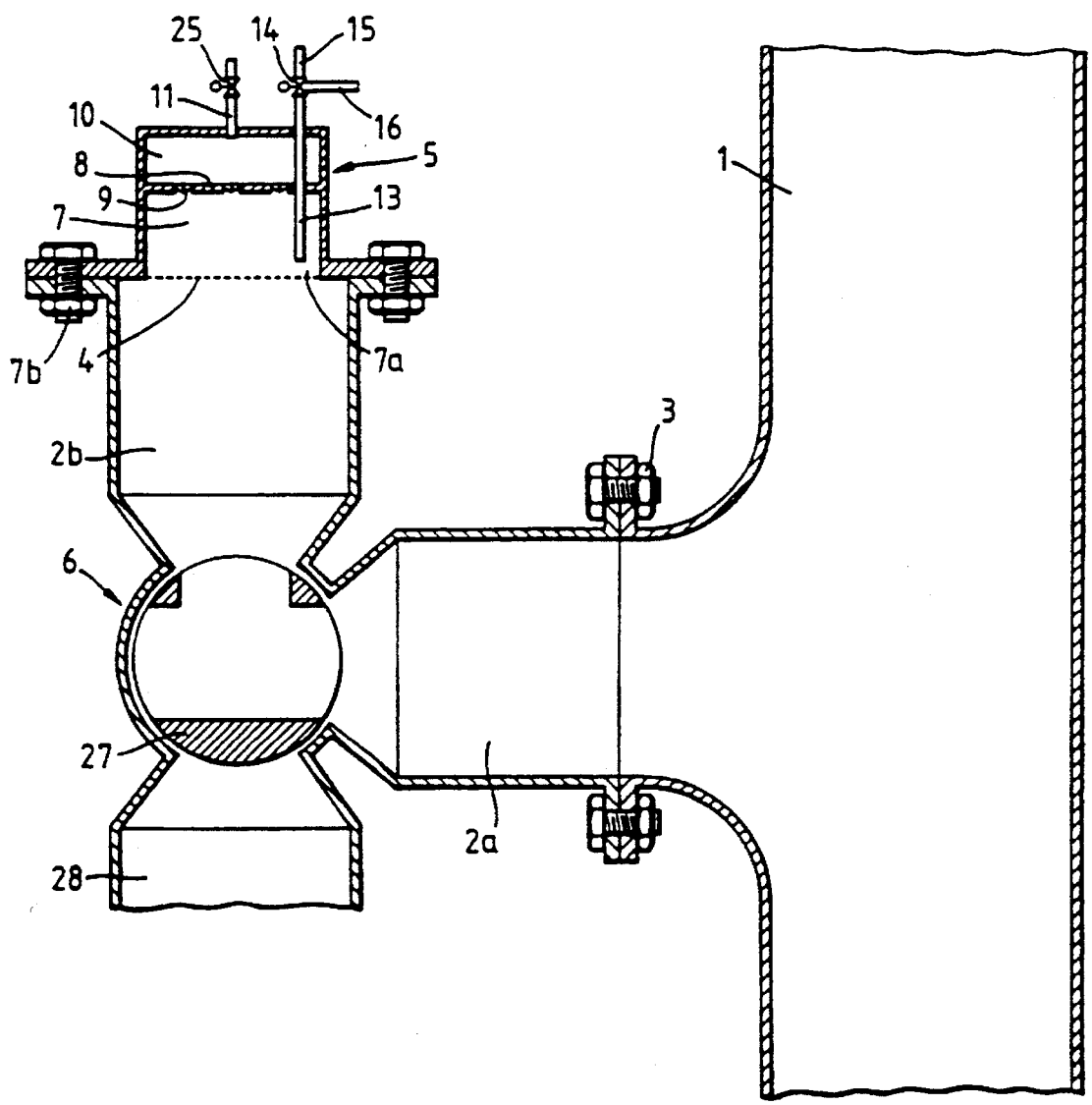
FIG. 2 shows a modification of FIG. 1.
Figure 3:
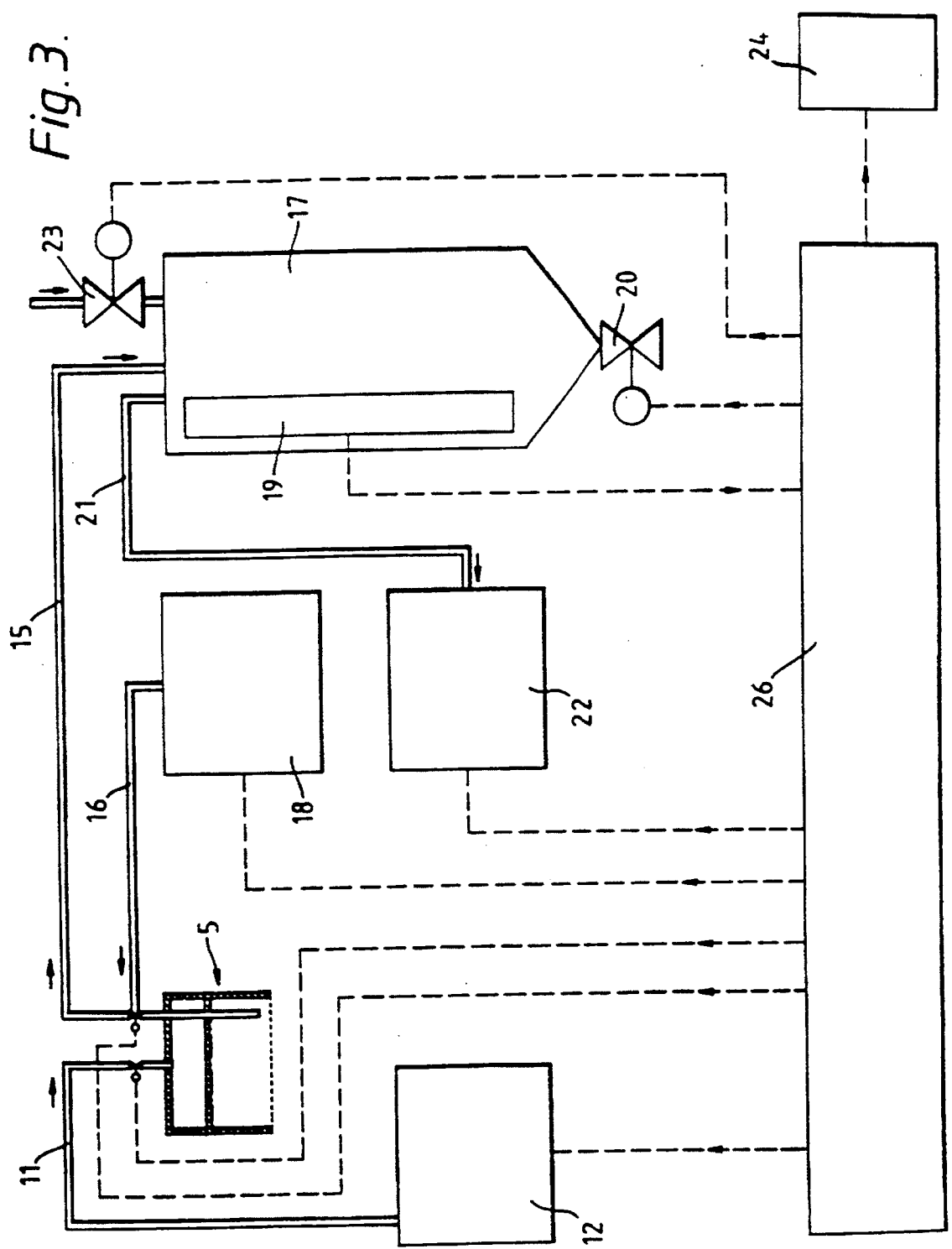
FIG. 3 is a diagrammatic flow diagram suitable for the systems of FIGS. 1 and 2.

Referring to FIGS. 1, 2 and 3, a service line 1 through which suspension is flowing has a sidearm 2 fitted to it as a T-piece. This sidearm serves as an inlet duct provided with bolting means 3 for securing it to the service line at one end and which is closed at its other end by a filter element 4 of a filter assembly 5. An inlet valve 6 is provided to permit closure of the inlet duct.

The filter assembly 5 comprises a filtrate collection chamber 7 that is open at its end 7a. This end is covered by the filter element 4 and is provided with bolting or other fastening means 7b for securing the chamber to the remainder of the apparatus. The chamber is closed at its other end by a rear wall 8 in which a plurality of sprays 9 are mounted. These sprays are supplied with pressurised water from a high pressure water chamber 10 supplied with water under an appropriate pressure through a valve 25 and a line 11 from a pressurised water supply 12.

A line 13 opens into the chamber 7 and leads from there to a 3-way valve 14 that interconnects with lines 15 and 16. Line 15 leads to a filtrate receiving tank 17 while line 16 leads to a supply 18 of compressed air. The tank 17 includes means 19 for determining volume of filtrate collected in the tank 17. The means 19 may be any suitable means for determining volume by, for instance, mass, integrated flow, pressure difference or fluid level. The tank 17 has a dump valve outlet 20 in its base by which the contents of the tank can be run to drain. Vacuum can be applied in the tank from a vacuum pump 22. A vent valve 23 may be provided for venting the tank to atmospheric pressure when required.

A computer control arrangement 26 provides for appropriate timing and sequential activation of the various components of the apparatus, the control circuits being shown diagrammatically in dashed lines. The computer automatically controls flocculant dosing apparatus 24. The dewatering apparatus is not shown.

There is a pump (not shown) for forcing suspension through the pipeline 1 and this creates an elevated pressure within pipeline 1 in the vicinity of sidearm 2 which is above atmospheric pressure. An appropriate pressure drop is maintained across the filter element 4 so as to cause filtration from the pipeline 1 through the filter element and into the chamber 7. This pressure drop can be controlled to a predetermined value, for instance, by means of a pressure transducer (not shown) attached to pipeline 1, and automatic controls whereby the vacuum applied through line 15 is varied in response to variations within the pipeline 1. An automatic vacuum or pressure regulation system may be attached to line 21 to maintain constant pressure drop in response to variation in-line pressure.

The diameter of the service flow pipeline 1 typically is in the range 50 to 1000 mm. The sidearm 2 typically has circular cross section but the cross section can be oval or of other convenient shape. The diameter of the sidearm typically is in the range 50 to 200 mm. The diameter of the chamber is typically in the same range and its length typically is in the range 10 to 100 mm. The volume of the tank 17 is often 2 to 10 liters, e.g. about 5 liters. Frequently the opening of the sidearm into the pipeline extends over from about ⅕th to ⅓rd of the periphery of the pipeline. The air purge is generally at a pressure of 50 to 1000 mm mercury above the pressure in the service line 1. The sprays 9 are generally located in the rear wall of the chamber and so may be 10 to 100 mm from the filter element. The pressurised water supply is generally designed to produce a pressure drop through the sprays of 5 to 100 bar.

A typical sequence starts with the filtrate collection vessel 17 empty, the filter element 4 clean, the dump valve 20 and the vent valve 23 open, the wash valve 25 closed, the filtrate valve 14 closing line 15 and joining lines 13 and 16, the vacuum pump 22 and the high pressure water supply 12 and the compressed air supply 18 off. At the start of the sequence the dump valve 20 and the vent valve 23 will close and the vacuum pump 22 will start.

The filtrate valve 14 will operate to close line 16 and join lines 13 and 15, which will apply vacuum built up in the filtrate collection vessel 17 to filtrate collection chamber 7 in the assembly 5. This will cause suspension to be pulled from the service line 1 into the sidearm 2 and onto the filter element 4 where it will de-water, building up a layer of cake on the lower side of the filter element. Filtrate produced in process will be pulled into the filtrate collection vessel 17 via line 13, valve 14 and line 15.

Flow and volume measurements are made on the collected filtrate. Pressure measurements are made in the sidearm 2 so that adjustments may be made to the pressure drop across the filter element. This dewatering process will continue until the supervisory computer 26 (which is in control of the vacuum pump, all the valves, the back-washing/air purge system and timing the filtration) determines that the measurement/filtrate collection stage of the sequence should terminate, for instance as a consequence of a predetermined volume of filtrate having been collected.

The vacuum pump 22 will switch off. The filtrate valve 14 will operate to close off line 15 to the filtrate collection vessel 17, and open the line 16 from the source of compressed air 18 to line 13.

The compressed air supply 18 will start, forcing downwardly the liquid in the chamber 7 and in the part of the sidearm 2 close to the filter element 4. This sidearm acts as a sleeve extending around the periphery of the filter element and confines the fluid and air against radially outward movement. The resultant interface between air in the upper part and fluid in the lower part can be forced by appropriate control of the amount of compressed air down beneath the filter element and down into the sidearm.

A short time later, for instance 30 seconds, the wash valve 25 will open and the supply of high pressure wash water 12 will start, feeding water for back-washing to line 11, through valve 25 and into chamber 10. The sprays 9 will distribute wash water, at high velocity, evenly over the rear of the filter element 4 in order to remove from this the solids accumulated during the dewatering cycle.

The vent valve 23 will open equalising the internal pressure within the filtrate collection vessel 17 to that of the atmosphere to allow the contents of the vessel to drain out under gravity during the next step.

The dump valve 20 will open, draining the contents of the filtrate collection vessel 17 to waste.

After the elapse of a suitable time, for instance 15 seconds to 2 minutes, the high pressure water supply 12 will stop, the wash valve 25 will close and the compressed air supply 18 will stop.

The supervisory computer 26 will make any necessary adjustments to the dewatering step that the system is controlling, usually before the washing stage. The sequence will repeat, immediately or after a suitable delay as necessary.

The back-washing of the system shown in FIGS. 1 and 2 will result in the filter cake being washed back into the line 1. The modification shown in FIG. 2 avoids this. Instead of having simple inlet valve 6, the inlet valve 6 is a three-way ball valve 27 that interconnects sidearm components 2a and 2b and a drain outlet 28. In the position shown, fluid communication is established between the service line 1 and the filter element 4. During back-washing, the three-way ball valve 27 would be rotated so as to isolate the filter element from the service line and to allow backwash liquor to be run to drain through the valve 27 and the drain outlet 28. The ball valve and the components 2a and 2b may all be of substantially uniform diameter, if this proves desirable to minimise risk of blockage. It may also be desirable to make components 2a and 2b as short as possible.

In FIGS. 1 and 2, the filter element preferably is an electroperforated foil 0.2 mm thick wherein the perforations are conical with a diameter of 0.5 mm in its upper surface and 0.85 mm in its lower surface, with 23% of the foil area being open.

The filter assembly in FIG. 5 consists of a frame 30 on which is fixedly mounted a collar 31 in which is mounted a filter element 4 and a ring gasket 37. A plug valve 32 shaped to fit sealingly within the lower face of the collar 31 is vertically reciprocable by a double acting air cylinder 33.

A chamber 7 that is open at its lower end 7a and closed at its upper end 35 is suspended from a double acting air cylinder 36 by which it can be vertically reciprocated. Appropriate actuation of the cylinder 36 and resultant movement of the chamber 7 relative to the collar 31 thus provides for alternately holding the open end 7a of the chamber 7 in fluid-tight contact with the gasket 37 and for separating the filter element from the chamber. The chamber typically has a length of 200 to 800 mm, for instance 500 mm, with a diameter ¼ to ½ the length.

An inlet 38 in the chamber is connected to a pipe 39 leading through a closable valve 40 from the service line 1 (not shown).

The head 35 of the chamber 7 has an array of sprays 9 fitted in it, and extending from a pressurised water manifold 41 that is fed from a supply pipe 11 (as in FIG. 3).

There is a lower level indicator 42 extending from the head down to near the base of the chamber, and an upper level indicator 43 extending through the head. This indicator has a capillary bore through it connected to an air line 44 that leads to a valve 45 by which the air line can be kept closed or can be opened to allow ingress of air from the atmosphere, or can allow application of vacuum through a vacuum line (not shown).

In operation, the cylinders 33 and 36 are operated so that the plug valve 32 and the end 7a each make fluid-tight contact with the filter element assembly 4, 31 and 37. With the air valve 45 open, suspension is run into the chamber through valve 40 and line 39 until the chamber is full to above the level 43. Valve 40 is closed. Valve 45 is closed so as to make the chamber air-tight or is opened to a vacuum line so as to apply vacuum in the chamber.

Plug valve 32 is then lowered. Because the chamber is airtight, the filter element initially holds the suspension in the chamber. At a suitable time after the plug valve is lowered the vacuum is broken by opening the valve 45 to the atmosphere and a timer in control means 26 is initiated. The time taken for draining the sample from the upper level probe 43 to the lower level probe 42 is recorded.

The cylinder 36 is then actuated to raise the chamber 7 above the filter element, typically giving a 50 mm clearance above and below the filter element. Water is forced through the jets 9 under high pressure to flush filter cake solids off the filter element 4.

The frame 30 is mounted in a container (not shown) and all the filtrate and wash water are collected in the base of the container and can be run to drain when required.

The various operations in this process, the timing, the determination of the filtration rate, and the generation of a signal for controlling dosing means are preferably all controlled by a computer control 26 as in FIG. 3. However if desired this filtration assembly can be operated manually (at least in part) and/or can be utilised for merely giving a visual display of the filtration rate parameter and the resultant information can be used for manual control of the dosage of chemical or for manual control of the conduct of the process, eg. dilution of the suspension or conditions of dewatering. It is also possible to utilise the filtration rate signal that is generated by this novel assembly to control the process automatically in some way that does not involve controlling the addition of chemical, for instance by controlling the dilution of the suspension or the conditions of dewatering or the freeness of the suspension (when it is a paper stock).

The screen 4 is preferably formed of a woven mesh or perforated stainless steel, such as is used in the Scandinavian Standard Freeness Tester. This apparatus is then of particular value when the suspension is a paper thin-stock (cellulosic concentration below 2%) but it can also be used for thick stock. However the assembly can be used with any of the other suspensions mentioned above, with appropriate choice of the filter element.

The invention is now further described by way of reference to the following example.

EXAMPLE

Sewage sludge conditioned with varying doses of dewatering cationic polyelectrolyte polymer was tested in a filter assembly as shown in FIG. 1.

Figure 4:
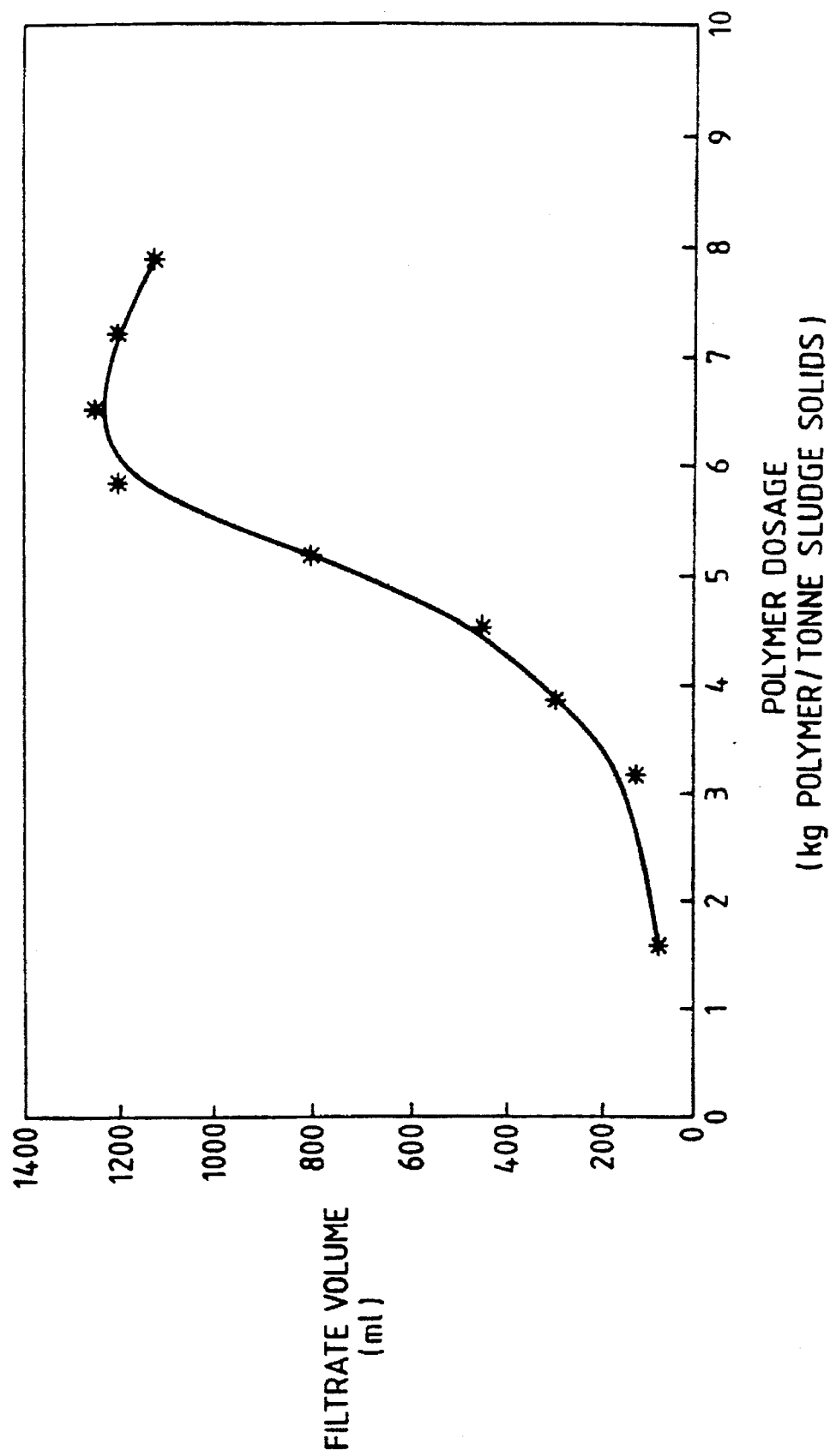
FIG. 4 is a graph showing the amount of the filtrate collected in a process at various dosages of flocculant.

FIG. 4 is a graph of volume of filtrate collected by the system of the invention against flocculant polymer dosed into the sludge. Dewatering performance is represented by the volume of filtrate collected, increased performance being represented by increased filtrate volume. The graph shows that increasing the dose of polymer increases the dewatering performance up to a maximum at a polymer dose of around 6.5 kg polymer/dry tonne sludge solids. Increasing the polymer dose past the maximum results in a fall-off in dewatering performance.

Following this analysis of dewatering performance of the polymer on the sludge, the dewatering process would be set to run at a polymer dose of 6.5 kg polymer/dry tonne sludge solids, i.e. maximum performance. The process would then be monitored by use of the system according to the invention, and the polymer dose increased or decreased according to variations in dewatering performance either side of the maximum, in order to retain maximum performance throughout the process.

We claim:

1. Apparatus for controlling the addition of chemical dewatering modifier by chemical dosing equipment to a suspension that flows through a service line towards a dewatering plant, the apparatus comprising testing means for measuring a test parameter of the suspension in the service line, and dose control means for automatically controlling the addition of the chemical by the dosing equipment in response to the measured test parameter, wherein the testing means includes;

a filtration assembly comprising a chamber which is open at one end across which a filter element is fitted and inlet means connectable to the service line for providing fluid communication between the filter element and the service line whereby suspension can be caused to flow from the service line to, and to be filtered through, the filter element, and means for measuring a filtration rate parameter of the suspension during the filtration of the suspension through the filter element, wherein the filtration rate parameter can be utilized by the dose control means as the measured test parameter for automatically controlling the addition of the polymeric flocculant, and wherein the apparatus includes;

a plurality of sprays permanently mounted with respect to the chamber and positioned to direct water against substantially the entire surface of the filter element, means for supplying pressurized water to the sprays, and a sequential filtration control for sequentially causing the filtration of the suspension through the filter element and subsequently supplying pressurized water to the sprays to wash filtered solids off the filter element.

2. Apparatus according to claim 1 in which the chamber includes means for determining the filtration volume which is achieved in a pre-determined time or the time required for achieving a pre-determined filtration volume.

3. Apparatus according to claim 1 including discharge means operable by the sequential filtration control for running to drain the filtered solid washed off the filter element.

4. Apparatus according to claim 1 including an inlet valve in the inlet means operable by the sequential filtration control for isolating the filter element from the service line.

5. Apparatus according to claim 1 in which the filter element is between the chamber and the inlet means, there are means for maintaining the chamber at a lower pressure than the pressure in the service line while the filter element is in fluid communication with the service line and thereby causing filtration of the suspension through the filter element and collection of filtrate in the chamber, and the sprays are positioned for back-washing the filter element.

6. Apparatus according to claim 5 in which a sleeve extends from around the periphery of the filter element in a direction leading away from the sprays, there are air supply means for supplying an air purge through the filter element in a direction leading away from the sprays so as to establish an interface in the sleeve between air and liquid in the apparatus, and the sequential filtration control is such as to cause the air purge to force the said interface along the sleeve onto the side of the filter element distant from the sprays before and/or during the supply of pressurized water to the sprays.

7. Apparatus according to claim 5 in which the inlet means comprise an inlet duct and in which the inlet duct has the filter element mounted across one end, and the other end includes means for fitting to the service line or is fitted to the service line.

8. Apparatus according to claim 7 in which there is an inlet valve operable by the sequential filtration control and a valved drain outlet form the duct operable by the sequential filtration control and that can be opened to permit drainage of wash water from the duct when the filter element is isolated form the service line by the inlet valve.

9. Apparatus according to claim 5 including a filtrate receiver in fluid communication with the chamber for receiving all the filtrate that enters the chamber, and the receiver includes volume-recording means for determining the volume of filtrate collected in the receiver.

10. Apparatus according to claimed 1 in which
the chamber is an upright chamber with the filter element in its base,
the inlet means comprise a pipe leading from the chamber above the filter element and connectable to the service line for leading suspension from the service line into the chamber, and the apparatus includes
an inlet valve in the pipe operable by the sequential filtration control for isolating the chamber from the service line and
support means for the filter element operable by the sequential filtration control alternately for holding the filter element in fluid-tight contact with the base of the chamber and for separating the filter element from the chamber before and during the supply of pressurized water to the sprays.

11. Apparatus according to claim 10 which includes means for determining filtration volume in a predetermined time or for determining the time required for a predetermined filtration volume, wherein the mans are located in the chamber or in the inlet means for the apparatus includes a collection vessel for receiving filtrate through the filter element and which includes the said means for determining filtration volume.

12. Apparatus according to claim 10 in which the support means for the filter element includes means for sliding the filter element transverse to the chamber between a position in which the filter element is in fluid-tight contact with the lower end of the chamber and a position in which the filter element is outside the chamber and positioned to be washed by the pressurized-sprays of water.

13. Apparatus according to claim 10 in which the filter support means for the filter element comprise means alternately for holding the filter element in fluid-tight contact with the base of the chamber and for separating the filter element downwardly relative to the chamber, and the apparatus includes means for recording the time taken for a predetermined volume of suspension to drain through the filter element.

14. Apparatus according to claim 13 including upper and lower liquid level detectors in the chamber and timing means for timing the time taken for the suspension to drain from the upper level detector to the lower level detector.

15. Apparatus according to claim 10 in which a housing (31) extends down from around the filter element and there is a valve for closing the housing beneath the filter element so as to prevent drainage through the filter element.

16. Apparatus according to claim 13 including a plug valve vertically reciprocable relative to the filter element into a sealing position in which it prevents drainage through the filter element.

17. Apparatus according to claim 16 including means for closing the chamber above the filter element against ingress of air, and air bleed mans for allowing ingress of air into the chamber above the filter element.

18. Apparatus according to claim 1 in which the means for supplying pressurized water can supply water at 20 to 100, bar.

19. Apparatus according to claim 1 in which the filter element is a sheet provided with drainage apertures that extend through its thickness wherein the drainage apertures have a conical shape with a diameter that is larger at the end of the apertures distant from the sprays than at the end adjacent the sprays.

20. Apparatus for flocculating a suspension and for dewatering the flocculated suspension, the apparatus comprising a dewatering plant, a service line through which the suspension can flow to the dewatering plant, chemical dosing equipment by which chemical dewatering modifier can be dosed into the suspension, and apparatus according to claim 1 for controlling the addition of the chemical.

21. A process for dewatering a suspension using apparatus according to claim 20 wherein the suspension is pumped through the service line, chemical dewatering modifier is added to the suspension by the chemical dosing equipment prior to, in or after flow through the service line and the flocculated suspension is dewatered in the dewatering plant, wherein a filtration rate parameter of the suspension is measured utilizing the said testing means and the addition of chemical by the dosing equipment is automatically controlled by the said dose control means in response to the measured filtration rate parameter.

22. A process according to claim 21 in which the suspension is selected from mineral suspensions, sewage suspensions, and cellulosic suspensions having a cellulosic solids content of not more than 2% by weight and the chemical is a polymeric flocculant.

23. A filtration assembly suitable for use in the apparatus according to claim 1 and comprising
an upright chamber which is open at its base,
a pipe leading from the chamber and connectable to the service line for leading suspension form the service line into the chamber,
an inlet valve in the pipe for closing the pipe,
a filter element than can extend across the open base of the chamber,
support means for alternately holding the filter element in fluid-tight contact with the base of the chamber and for separating the filter element from the chamber, and
plurality of sprays permanently mounted with respect to the chamber and positioned to direct water against substantially the entire surface of the filter element when it is separated from the chamber.

24. An assembly according to claim 23 in which the support means for the filter element comprise means for alternately holding the filter element in fluid-tight contact with the base of the chamber and for separating the filter element vertically from the chamber.

25. An assembly according to claim 23 including upper and lower liquid level detectors in the chamber for defining a predetermined volume of suspension in the chamber.

26. An assembly according to claim 23 including a housing which extends down from around the filter element, and including a valve for closing the housing beneath the filter element so as to prevent drainage through the filter element.

27. An assembly according to claim 26 in which the valve for closing the housing below the filter element comprises a plug valve vertically reciprocable relative to the filter element into sealing engagement with the housing.

28. An assembly according to claim 27 including means for closing the chamber above the filter element against ingress of air, and air bleed means for allowing ingress of air into the chamber above the filter element.

29. A filtration assembly suitable for use in the apparatus according to claim 1 comprising a chamber that is open at one end, inlet means leading from the chamber and connectable to the service line, a filter element that can be fitted across the open end of the chamber, intermediate the chamber and the inlet means air purge means for forcing an air purge through the filter element towards the inlet means, a plurality of sprays positioned in the chamber for backwashing substantially the entire surface of the filter element, and wherein the inlet means comprises an inlet duct which includes an inlet valve for closing the duct, a valved drain outlet from the duct that can be opened when the valve is closed in order to drain wash-water from the duct, and means for fitting the end of the duct distant from the chamber to the service line.

30. A filtration assembly suitable for use in apparatus according to claim 1 and comprising a chamber which is open at one end, a filter element that can be fitted across the open end, inlet means connectable to the service line for providing fluid communication between the filter element and the service line, and a plurality of sprays permanently mounted with respect to the chamber and positioned to direct water against substantially the entire surface of the filter element, and in which the filter element is a sheet provided with drainage apertures that extend through its thickness wherein the drainage apertures have a conical shape with a diameter that is larger at the end of the apertures distant from the sprays than at the end adjacent the sprays.

* * * * *